United States Patent [19]
Lee et al.

[11] Patent Number: 5,125,010
[45] Date of Patent: Jun. 23, 1992

[54] LAP COUNTING SYSTEM

[76] Inventors: Lewis C. Lee, W. 3114 Sheridan Ct., Spokane, Wash. 99205; T. Lester Wallace, 600 Sharon Park Dr. A103, Menlo Park, Calif. 94025

[21] Appl. No.: 597,159

[22] Filed: Oct. 15, 1990

[51] Int. Cl.[5] .................. G01C 22/00; G06M 1/22; G06M 3/02
[52] U.S. Cl. ..................... 377/24.2; 377/5; 377/112; 482/55
[58] Field of Search ............ 377/5, 24.2, 112; 272/71

[56] References Cited

U.S. PATENT DOCUMENTS

| 4,518,266 | 5/1985 | Dawley | 377/24.2 |
| 4,530,105 | 7/1985 | Rabinowitz | 377/24.2 |
| 4,700,369 | 10/1987 | Siegal et al. | 377/24.2 |
| 4,780,085 | 10/1988 | Malone | 272/71 |
| 4,823,367 | 4/1989 | Kreutzfeld | 377/24.2 |
| 4,932,045 | 5/1990 | Kasoff et al. | 377/24.2 |

FOREIGN PATENT DOCUMENTS

| 0234482 | 10/1986 | Japan | 377/24.2 |
| 2176036 | 12/1986 | United Kingdom | 377/24.2 |

Primary Examiner—John S. Heyman
Attorney, Agent, or Firm—Wells, St. John & Roberts

[57] ABSTRACT

The present invention relates to a lap counting system having a radio communication range between a radio transmitter and a radio receiver. The lap counting system increments a lap count each time the distance between the receiver and the transmitter becomes smaller than the communication range.

18 Claims, 5 Drawing Sheets

LAP COUNTING SYSTEM

BACKGROUND OF THE INVENTION

1. Field of the Invention

The present invention relates to a lap counter, and more particularly, to a lap counting system having a radio communication range between a radio transmitter and a radio receiver which increments a lap count each time the distance between the receiver and the transmitter becomes smaller than the communication range.

2. Background and Related Art

In certain sporting events, such as swimming and track, athletes traverse the same course multiple times during a single workout. As a result, these athletes must maintain a count of the number of laps completed. Mentally maintaining this lap count is burdensome in that the athlete may lose track of the number of laps or may, for psychological reasons, not want to count each grueling lap. These athletes have thus expressed an interest in a lap counting device which would maintain an accurate lap count during their workouts.

The lap counting device should be foremost reliable, inexpensive, and easy to use. It should also be portable and lightweight so that the athletes can easily carry it to the pool or track, and it should be compact for easy storage.

Various lap counting systems have been developed. However, none of these systems satisfy all of the above mentioned attributes. For example, some lap counting systems employ ultrasonic transducers to detect the athlete on each lap. These systems have serious drawbacks in that they cannot discriminate between different athletes, for example, between different swimmers swimming in the same lane, or between different runners on the same track. Furthermore, because ultrasonic systems are directional and line-of-sight, ultrasonic systems must be mounted in a special manner along the pool or track.

Other lap counting systems employ infrared transducers. These systems have serious drawbacks similar to those of the ultrasonic systems. In addition, because the athlete must wear either an infrared transmitter or a receiver, the athlete must consciously directionally orient the unit he/she wears toward the stationary unit to trigger a counting of each lap.

Some lap counting systems, designed specially for swimmers, require the swimmer to touch a pad to effectuate a count. These lap counting systems have several serious drawbacks: the pads are difficult to mount to the side of the pool, the pads are easily dislodged, the pads are expensive, the pads may be touched by other swimmers which disrupts an accurate count for the desired swimmer, physical switches within the pad are unreliable, and swimmers must locate and touch the pads each lap.

SUMMARY OF THE INVENTION

The present invention has been designed to solve the above mentioned drawbacks inherent in prior art lap counters. The present invention is a lap counting system having a radio communication range between a radio transmitter and a radio receiver. The lap counting system increments a lap count each time the distance between the receiver and the transmitter becomes smaller than the communication range.

By employing radio frequency communication, the unit placed by the pool or track does not need to be specially mounted. Nor, does the athlete need to orient his/her unit toward the poolside or trackside unit.

The present invention also eliminates the expense and problems associated with pads employed in the prior art swimming systems.

BRIEF DESCRIPTION OF THE DRAWING

These and other advantages will become more apparent from the detailed description of the preferred embodiment along with the following drawings.

DESCRIPTION OF THE PREFERRED EMBODIMENT

The preferred embodiment of the present invention described hereinbelow is adapted for use by swimmers. However, it is to be understood that other sporting events having a redundant course, such as track, fall within the contemplation of the present invention.

Figure 1:
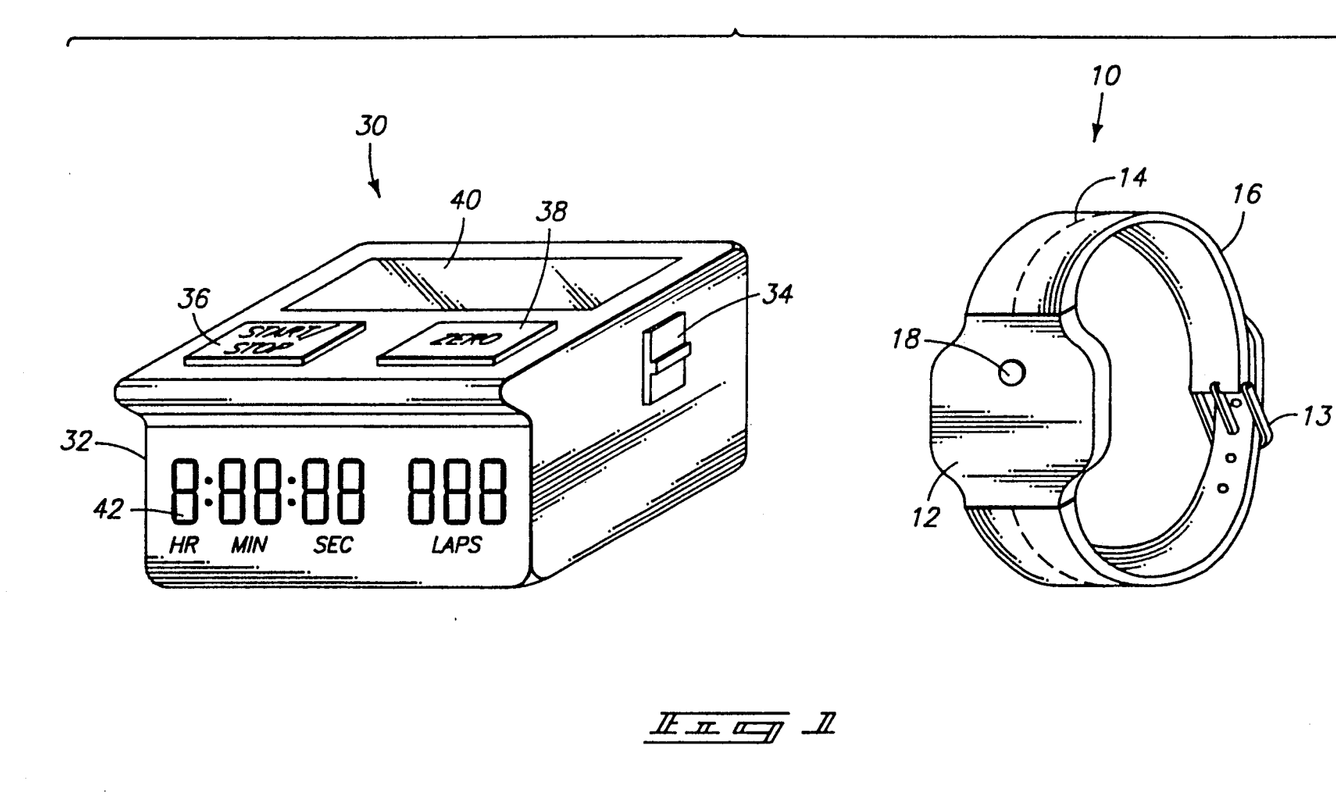
FIG. 1 shows a lap counting system according to a first embodiment of the present invention.

FIG. 1 shows one embodiment of a lap counting system according to the present invention. The lap counting system has a swimmer's unit 10 which includes a radio transmitter, and a poolside unit 30 which includes a radio receiver. The swimmer's unit 10 is shown in the form of a water-resistant wrist watch having a housing 12, a wrist band 16 and a clasp 13 which may be worn by the swimmer. The radio transmitter is contained in a housing 12 and a radio antenna 14 is located in the wrist band 16. An activate push-button 18 is located on the housing 12 to activate the transmitter circuitry.

The poolside unit 30 has a water-resistant housing 32, a power ON/OFF switch 34, a START/STOP push-button 36, a ZERO push-button 38, a solar collector 40, and an LCD display 42. The START/STOP push-button 36 and the ZERO push-button 38 are relatively large to facilitate easy depression by the swimmer when initiating a lap counting session. The LCD display 42 has two sections, a time section and a lap section. The time section has a single display digit for an hours value, two display digits for a minutes value and two display digits for a seconds value. These display digits are correspondingly labelled as "HR" for hours, "MIN" for minutes, and "SEC" for seconds. The lap section has three display digits for a lap count and is labelled "LAPS" for number of laps counted. The entire poolside unit 30 is sealed to prevent water from entering the housing 32 through push-buttons 36 and 38, ON/OFF switch 34, solar collector 40, or LCD display 42.

The poolside unit 30 also has a base portion comprising an insulative rubber mat or plural rubber pegs which permit the unit to be insulated from a wet surface alongside the pool. Because the present invention employs RF communication, the poolside unit 30 need not be specially mounted in a specific orientation as required by conventional infrared and ultrasonic systems. Further, the poolside unit 30 does not require any special pads or the like.

The following disclosure describes the circuitry of the swimmer's unit 10 and the poolside unit 30.

SWIMMER'S UNIT

Figure 2:
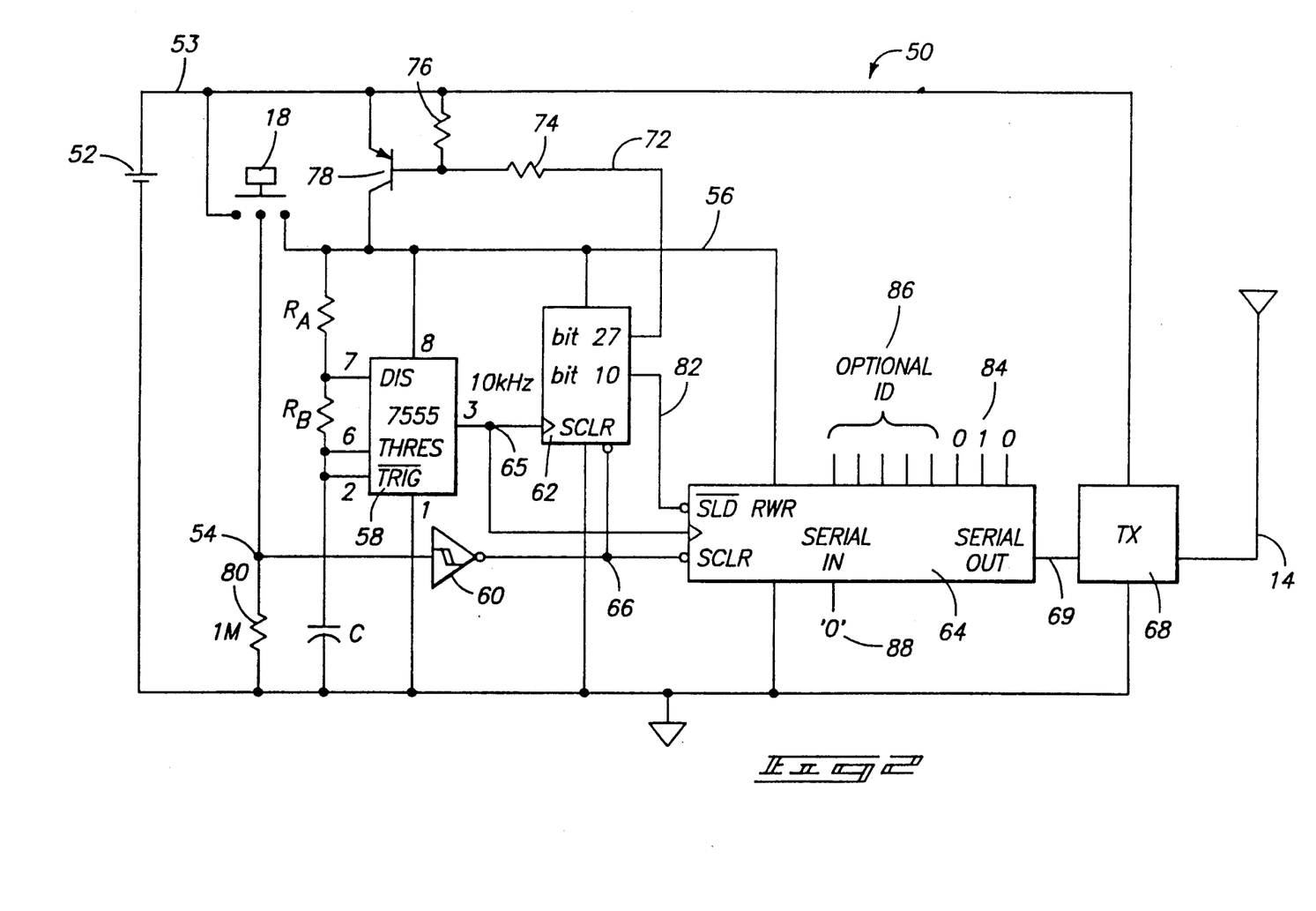
FIG. 2 is a schematic of the swimmer's unit.

FIG. 2 shows the circuitry of the radio transmitter 50 employed in the swimmer's unit 10 shown in FIG. 1. The transmitter 50 transmits for a period of approximately 1.8 hours upon momentary depression of activate push-button 18. After this time, the swimmer's unit 10 is disabled to conserve battery power, and to extend the life of battery 52.

When activate push-button 18 is depressed, node 54 and internal power line 56 are coupled to battery 52 via battery power line 53. As a result, square wave generator 58, Schmidt trigger inverter 60, counter 62, and shift register 64 begin to operate. Square wave generator 58 outputs a square wave clock signal of approximately 10 kHz on node 65 to clock counter 62 and shift register 64. This 10 kHz frequency is determined by the values of resistors $R_A$, $R_B$ and capacitor C. The positive voltage at node 54 causes Schmidt trigger inverter 60 to force node 66 low and to clear counter 62 and shift register 64. Because transmitter 68 is deactivated whenever output 69 from shift register 64 is low, the cleared shift register results in a deactivated transmitter and no transmission occurs from antenna 14.

Because counter 62 is also cleared, the bit-27 output 72 of counter 62 is low. A voltage divider is therefore formed between resistors 76 and 74, transistor 78 is turned on, and internal power line 56 is connected to battery power line 53 through transistor 78. Internal power line 56 is therefore "latched" high when activate push-button 18 is depressed, thereby remaining high for a predetermined time after activate push-button 18 is released.

When activate push-button 18 is released by the swimmer, resistor 80 pulls down node 54 causing node 66 to go high. Counter 62 is thus no longer cleared and begins incrementing. While the bit-10 output 82 of counter 62 is low, shift register 64 is held in a parallel load condition. Because the first bit of start bits 84 is a "0", transmitter 68 remains deactivated. When counter 62 increments to the point that the bit-10 output 82 goes high, shift register 64 is released and the start bits "010", followed by identification code 86, are sequentially shifted out and transmitted via transmitter 68.

The identification code 86 may be set during construction of the swimmer's unit 10 by cutting traces to power and ground on the swimmer's unit circuit board. Alternatively, identification code 86 may be set by flipping a dedicated dip switch provided for this purpose or by blowing fuses or the like in a custom or semi-custom designed integrated circuit.

After start bits 84 and identification code 86 are shifted out of shift register 64, the output of the shift register 64 returns to a low level because the serial input 88 to shift register 64 is tied low. This remains so until bit-10 line 82 again goes low. A radio frequency transmission is therefore made from transmitter 68 each $2^{10}$ times as long as the period of the square wave. With the square wave frequency being set at 10 kHz, a transmission will occur approximately ten times each second. The duration of each transmitted bit is the period of the square wave.

The parallel loading and shifting out of the start bits 84 and the identification code 86 continues repeatedly until the bit-27 output 72 of counter 62 finally goes high. This occurs $2^{27}$ periods of the square wave (approximately 1.8 hours) after the swimmer releases activate push-button 18. Transistor 78 is then switched off, battery power line 53 is disconnected from internal power line 56, and battery power is conserved when the transmitting unit is no longer being used. Pullup resistor 76 ensures that transistor 78 remains off during the period that counter 62 is not powered.

The approximate 1.8 hour period of operation for the swimmer's unit 10 is chosen to be somewhat longer than a long workout of a serious lap swimmer. If a swimmer wishes to swim longer, activate push-button 18 may be depressed again for another 1.8 hours of use. On the other hand, the present invention may be easily adopted to operate for a duration shorter than the 1.8 hour period. For example, the bit-26 output of counter 62 may be used to establish an approximate 0.9 hour period of operation.

Numerous low power radio frequency oscillators known in the art, such as single stage Hartley, Colpitts, and Pierce type oscillators can function as transmitter 68. The strength of the radio signal arriving at the poolside unit 30 from transmitter 68 should be of such a signal strength so that the distance at which poolside unit 30 begins to receive transmissions is significantly less than the length of an average lap swimming pool. This short distance allows the radio frequency oscillator to be powered with a low voltage on the order of 3 volts. The distance at which receiver 102 (discussed below with reference to FIG. 3) begins to receive transmissions from transmitter 68 should be approximately five feet. In this embodiment where antenna 14 is relatively short due to the antenna's being placed in wrist band 16, the frequency of the carrier signal should be kept as low as possible to reduce the attenuating effect of the transmitter's being frequently surrounded by water.

The low voltage supply requirement of the transmitter 68, along with the power saving deactivating feature of swimmer's unit 10, allow a single inexpensive lithium battery 52 to power swimmer's unit 10 for a period of 10 years. The fact that the swimmer's unit 10 only transmits for a very small portion of the time allows the power consumption of the transmitter 68 during transmissions to be as high as required to achieve the required signal strength at the poolside unit 30. Because the swimmer's unit 10 is capable of operating for 10 years with a single battery, the transmitter 50 may be permanently sealed in water resistant housing 12 during manufacturing. Therefore, the cost of providing a way to replace battery 52 is avoided.

Poolside Unit

Figure 3:
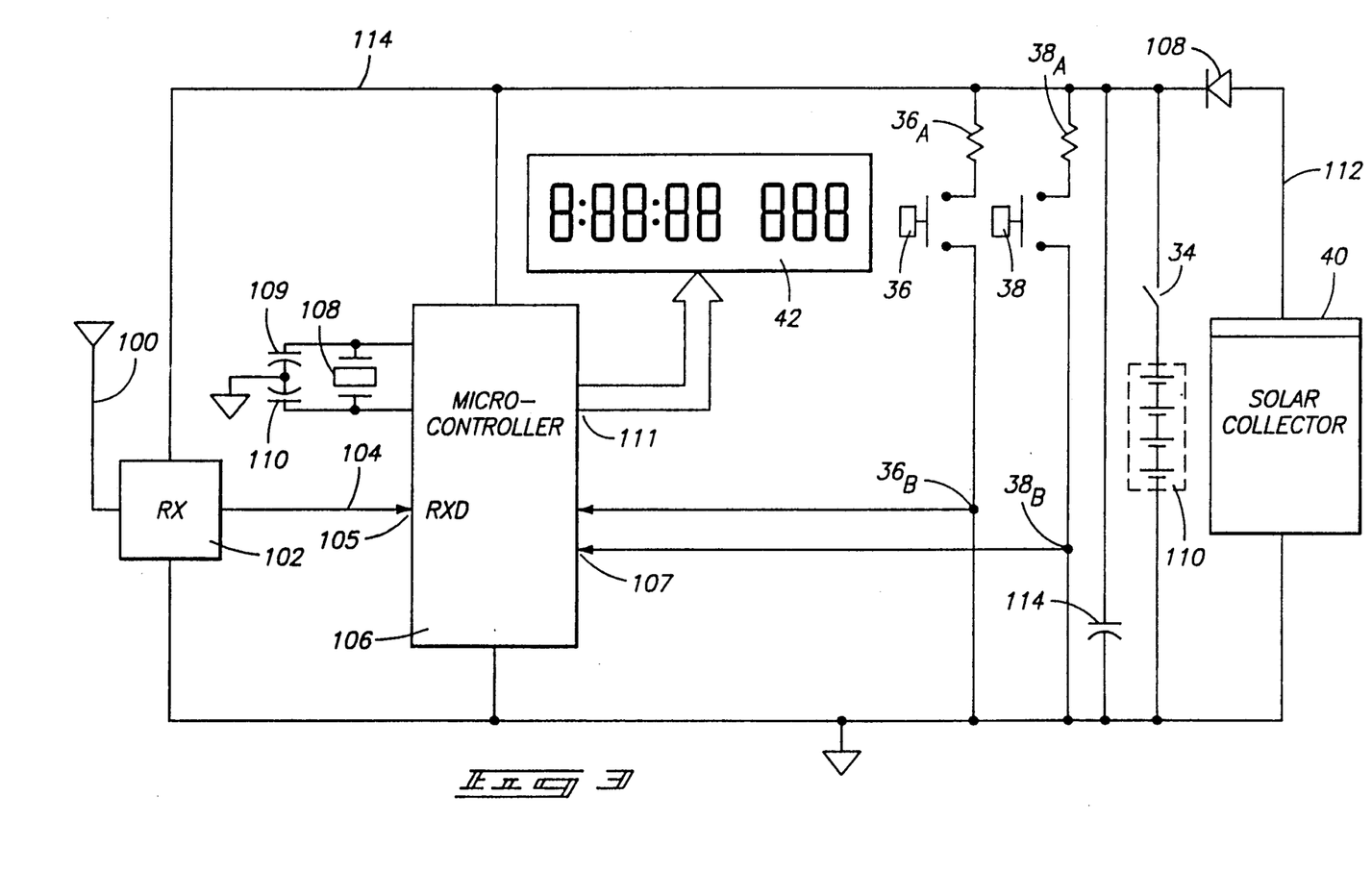
FIG. 3 is a schematic of the poolside unit.

FIG. 3 shows the circuitry of poolside unit 30 shown in FIG. 1. Poolside unit 30 receives transmissions on antenna 100 which is located inside housing 32. Amplitude modulation (AM) receiver circuit 102 removes the radio frequency carrier and outputs a bit stream of the modulating signal over line 104 to the receive data RXD input pin 105 of micro-controller 106 RXD input pin 105 is the pin customarily provided on microcontrollers for receiving serial asynchronous bit streams.

Microcontroller 106 has on-board RAM for program execution and data manipulation, on-board EEPROM for program and data storage, on-board timer circuits capable of keeping time of day, output port 111 for outputting data to LCD display 42, and parallel input port 107 for receiving input information from START/STOP and ZERO push-buttons 36 and 38.

Crystal 108 and capacitors 109 and 110 are connected in standard fashion to the oscillator of microcontroller 106.

Microcontroller 106 controls LCD display 42 by writing data from output port 111. LCD display 42 may incorporate a driver chip with internal registers and/or circuitry for driving the actual LCD display. Alternatively, microcontroller 106 contains the circuitry for directly driving the actual LCD display.

When depressed, START/STOP and ZERO push-buttons 36 and 38 cause nodes 36B and 38B to be pulled high to power line 114 through resistors 36A and 38A, respectively. Microcontroller 106 reads the logic level of nodes 36B and 38B and debounces these values digitally via input port 107.

Solar collector 40 and batteries 110 are provided to power the circuitry of poolside unit 30. When adequate solar radiation is incident on solar collector 40 (positioned on the upper surface of poolside unit 30 as shown in FIG. 1), solar collector 40 outputs a powering voltage onto line 112, through diode 108, and onto power line 114. Diode 108 prevents power from power line 114 from bleeding back through solar collector 40 when solar collector 40 is not supplying an adequate voltage to power the poolside unit 30. By employing solar collector 40 as a power source, a swimmer merely needs to place poolside unit 30 in the sun or under building lights to effectuate a power supply. Because solar collector 40 is always connected to power line 114, the swimmer will know that poolside unit 30 is powered because zeros will appear on LCD display 42 if poolside unit 30 has adequate power.

In the event there is not adequate solar radiation, poolside unit 30 is optionally powered by removable batteries 110 shown in a dashed box. ON/OFF switch 34 is provided to prevent battery drain when poolside unit 30 is not in use. Batteries 110 can therefore be switched onto or off of power line 114 via switch 34. A removable hatch in the back of the receiver housing 32 allows spent batteries to be removed and replaced. Capacitor 114 is provided between power line 114 and ground.

System Operation

Figure 4:
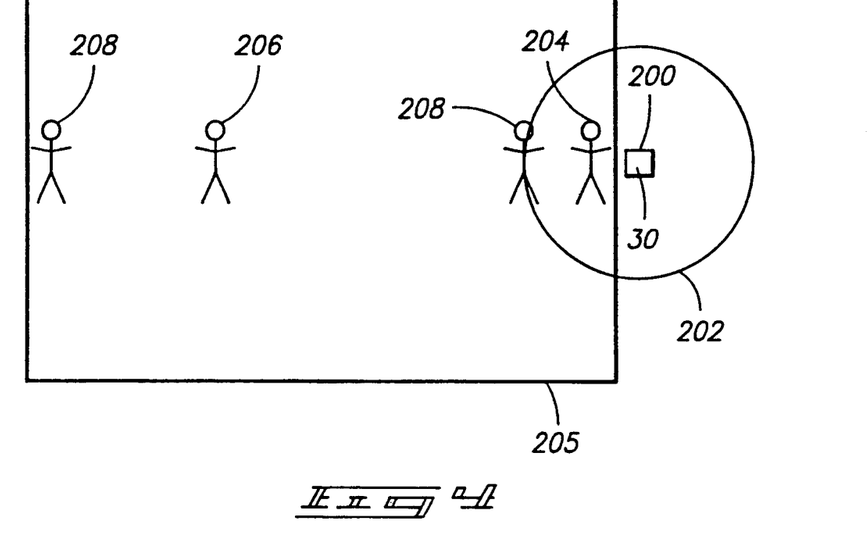
FIG. 4 illustrates the operation of the present invention in a swimming pool.

The operation of the lap counting system according to the present invention is discussed below with reference to FIG. 4. The swimmer places poolside unit 30 at location 200 along side of pool 205. Incident solar radiation on solar collector 40, or power from batteries 110, powers poolside unit 30. After being reset on power up, microcontroller 106 causes "0:00:00 000" to be displayed on LCD display 42.

The swimmer then depresses the activate push-button 18 on the swimmer's unit 10 he/she is wearing. Because the swimmer is within the communication range 202 of the lap counting system, the swimmer is able to see that the transmissions are being received because microcontroller 106 causes one of the colons in the time section of LCD display 42 to flash. Once the swimmer has checked that the lap counting system is functioning and that transmissions are being received, the swimmer enters the pool at location 204. The swimmer depresses START/STOP push-button 36 once and notes that the swim time being displayed is incrementing. The swimmer then begins swimming to the other side of the swimming pool away from the poolside unit 30 at location 200.

The poolside unit 30 detects when no transmissions have been received within a predetermined period of time (for example, five seconds). When this occurs, the poolside unit 30 assumes that the swimmer has swum out of communication range 202 of the system. The swimmer then continues to swim across pool 205 as depicted in FIG. 4 as successive locations 206 and 208. The next time the poolside unit 30 receives a predetermined number of transmissions in a second predetermined period of time (for example, ten transmissions in 5 seconds), the poolside unit 30 assumes that the swimmer has returned from the opposite side of the pool and into communication range 202. The poolside unit 30 therefore increments the lap count by two when the swimmer is about at location 208 indicating that the swimmer has swum two laps.

This sequence is repeated as the swimmer swims laps. If the swimmer wants to take a break, the swimmer depresses the START/STOP push-button 36 again. Both the lap counter and the timer are stopped. When the swimmer wishes to start swimming again after the break, he/she pushes START/STOP push-button 36 and poolside unit 30 continues counting laps and timing from where it left off. In the alternative, if the swimmer wishes to start timing and lap counting anew, the swimmer depresses ZERO push-button 38 which restarts the counting sequence from time zero and lap zero.

When the swimmer completes his/her workout, he/she stops poolside unit 30 by depressing START/STOP push-button 36. The total swim time and the number of laps are then easily read from LCD display 42. The swimmer's unit 10 will automatically turn itself off 1.8 hours after activate push-button 18 was depressed at the beginning of the workout. The poolside unit 30 will remain powered as long as solar collector 40 receives adequate incident solar radiation or as long as batteries 110 are switched on via ON/OFF switch 34.

The probability that two swimmers using the lap counting system will swim in the same pool at the same time within communication range of the other swimmer's system is very low. Even if this does occur, the probability that the swimmer's unit of one swimmer will be picked up by the other swimmer's poolside unit is reduced to practically zero because the swimmer's units are programmed with different identification codes 86. To guard against the poolside unit's deciphering transmissions from other sources as transmissions from its associated swimmer's unit, the identification code 86 of each swimmer's unit may contain an error detection code such as a cyclic redundancy check (CRC) code. The poolside unit will therefore be able to calculate what CRC code should have been transmitted with each received identification code. After comparing this calculated CRC code with the CRC code received, false transmissions can be identified and ignored.

The poolside unit 30 has stored in EEPROM nonvolatile memory the identification code 86 corresponding to the swimmer's unit 10. The poolside unit 30 is programmed with the identification code 86 by having one and only one swimmer's unit 10 within the communication range of poolside unit 30. START/STOP push-button 36 and ZERO push-button 38 are then simultaneously pushed to instruct poolside unit 30 to store in EEPROM the received identification code. The microcontroller 106 uses this stored identification code to decipher transmissions received in the future. A poolside unit 30 only acknowledges transmissions which have the identification code 86 with which that poolside unit 30 has been programmed. The poolside unit 30 may also be reprogrammed to receive a different identification code from another swimmer's unit 10 in the event, for example, that the battery of the original swimmer's unit expires or is lost.

Accordingly, the present invention permits the poolside unit 30 to discriminate between swimmers without any special mounting orientation as required by conventional lap counting systems. Many prior art devices, such as ultrasonic detecting systems, are incapable or discriminating between swimmers. Other prior art devices, which are capable of discrimination, such as infrared detecting systems, require specific, and often awkward, orientation.

OTHER EMBODIMENTS OF THE PRESENT INVENTION

Figure 5:
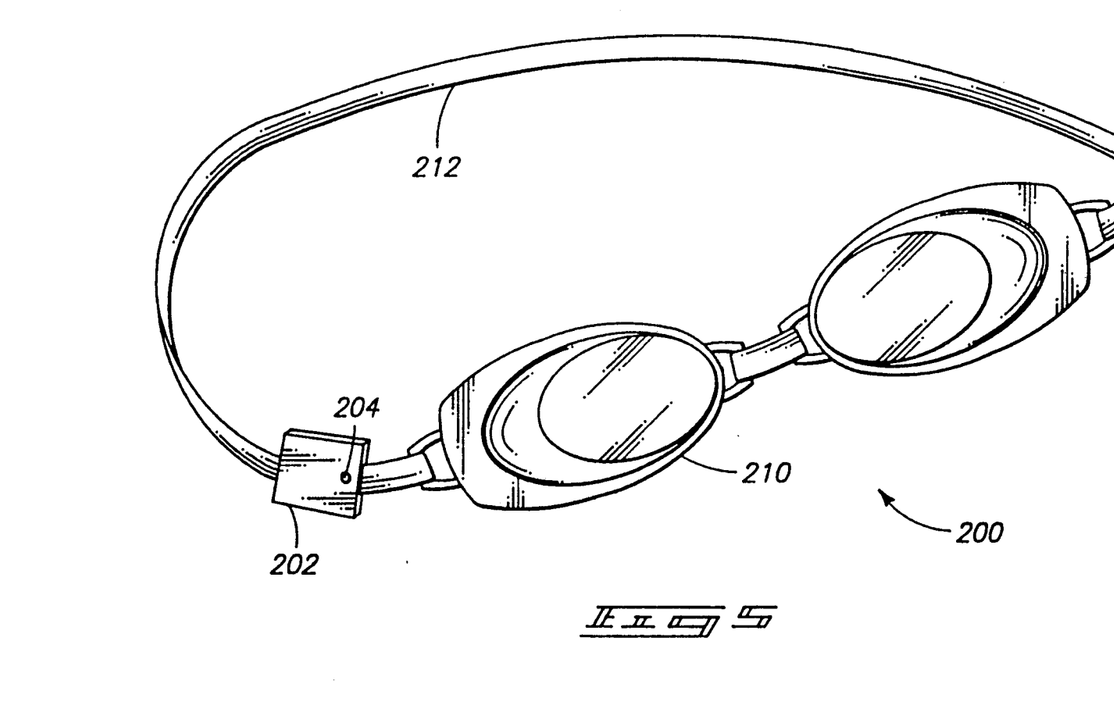
FIG. 5 shows an embodiment of the present invention involving goggles for swimmers.

FIG. 5 shows another embodiment of the swimmer's unit according to the present invention. Swimmer's unit 200 comprises water-resistant housing 202 which is secured to a swimmer's goggles 210. The swimmer's unit 200 also has an activate push-button 204 which operates identically to the activate push-button 18 discussed above. The antenna for the swimmer's unit 200 is housed in housing 202. In an alternative variation of this embodiment, the swimmer's goggles 210 may be specially designed to contain the circuitry of FIG. 2. In other embodiments, the antenna is housed in head band 212.

Figure 6:
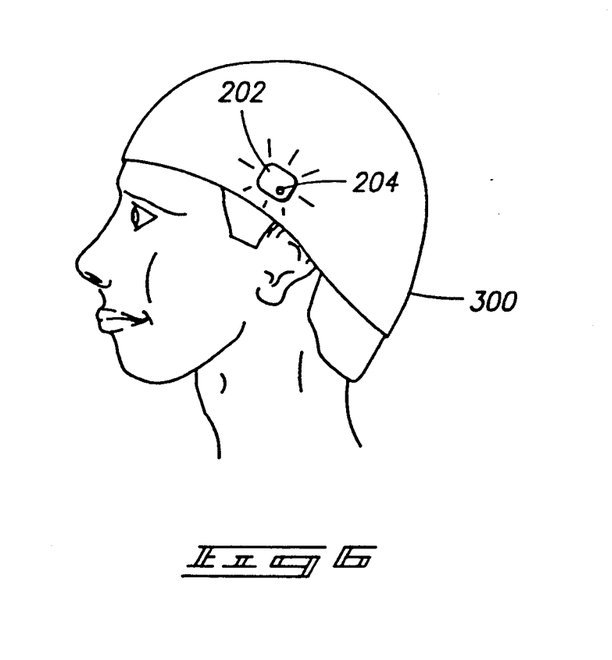
FIG. 6 shows another embodiment of the present invention involving a swim cap for swimmers.

FIG. 6 depicts an embodiment in which the transmitter circuitry is contained in housing 202 which is in turn incorporated into swim cap 300. Activate pushbutton 204 operates as does pushbutton 18 discussed above. Placement of the transmitter in a wrist watch, a pair of goggles, or a swim cap ensures that the radio transmitter is frequently above the surface of the water during swimming. Because the transmitter makes about ten transmissions per second, radio wave attenuation and reflection due to the transmitter's being under water will not seriously impede system performance.

In another embodiment of the present invention, the circuitry of swimmer's unit 10 of FIG. 2 may be simplified by eliminating shift register 64. Although the resultant system no longer discriminates between swimmers, there is an advantage of reduced unit cost. No cutting of traces or setting of dip switches is required. Further, because the probability of two swimmers, both having non-discriminating systems, swimming near enough in a pool to trigger erroneously the other swimmer's poolside unit is small, this embodiment is both functional and economical.

In yet another embodiment, the present invention is adapted to display the total distance traveled during the swimmer's workout. The microcontroller 106 of the poolside unit 30 is programmed to calculate this total distance by multiplying the number of laps times the distance of each lap. There are numerous ways in which the distance of each lap can be programmed into the microcontroller 106. For example, the swimmer could depress and hold START/STOP push-button 36 for a preset time period (five seconds) which would trigger a LAP mode. Once LAP mode is entered, START/STOP push-button 36 and ZERO push-button 38 become incrementing and decrementing buttons to set a desired distance as displayed on the lap section of the LCD display 42. If the pool was a 10 meter pool, the swimmer would increment up (using for example, START/STOP push-button 36) to a value 10 shown on the LCD display 42. To leave the LAP mode, the START/STOP pushbutton is again depressed and held for the five second preset time period.

After the workout, the swimmer may reenter the LAP mode to reveal the total distance which is then displayed on the lap section of the LCD display 42. The units of measure correspond to the units of the initially entered distance. To ensure that the distance is fully displayed, the lap section of the LCD display 42 may be adapted to have four digits, rather than the three digits shown in FIG. 1.

Other calculations, such as average lap time, may also be obtained by the present invention. Of course, the LCD display 42 may include dedicated distance and average lap time sections in addition to the those time and lap sections depicted in the preferred embodiment described above.

In another embodiment, the system involves an additional poolside unit called the relay unit. The circuitry of the relay unit is very similar to that of the poolside unit except that receiver 102 comprises both a receiver and a transmitter. The transmitter is modulated on and off by microcontroller 106 so that serial bit sequences are transmitted from antenna 100. This relay unit is located at the opposite end of the pool from the poolside unit to check that the swimmer penetrates a second communication range of the relay unit at the opposite end of the pool. The relay unit detects that this second communication range has been penetrated in the same way that the poolside unit detects that the swimmer has penetrated its communication range.

When the second communication range has been penetrated, the relay unit transmits a serial bit sequence different from that sent from the swimmer's unit back to the poolside unit. The relay unit may transmit the same identification code, however, if the sum of the first communication range and second communication range is less than the length of the pool. The poolside unit still requires only one receiver 102 because the same radio frequency is transmitted by the relay unit as is transmitted by the transmitting unit.

It is to be understood that the invention is not limited to the disclosed embodiment, but is intended to cover various modifications and equivalent arrangements included within the spirit and scope of the appended claims.

We claim:

1. A lap counting system comprising:
   remote means comprising:
   attaching means for attaching the remote means to a user;
   transmitting means for transmitting a radio signal; and
   a timing means which causes said transmitting means to transmit a plurality of bursts of said radio signal during a first period, each of said plurality of bursts being followed by a second period in which said radio signal is not transmitted;
   an activate electrical contact means for causing the transmitting means to transmit alternately said plurality of bursts and said second periods during a third period of time after said activate electrical contact means is activated, said timing means deactivating the transmitting means from transmitting said bursts after expiration of said third period of time from the last activation of said activate electrical contact means; and central means comprising:
receiving means for receiving said radio signal, said receiving means having a communication range with said transmitting means, the receiving means outputting a reception signal indicative of when said transmitting means enters said communication range;
processing means for incrementing a lap count when said reception signal indicates that said transmitting means enters said communication range; and
display means for displaying said lap count.

2. The lap counting system of claim 1, wherein said attaching means comprises a water resistant housing with one of (1) a wristband, (2) swim goggles, and (3) a swim cap.

3. The lap counting system of claim 1, wherein said remote means transmits a remote identification code modulated on said radio signal, wherein said reception signal output from the receiver means is indicative of the remote identification code, and wherein said central means only increments said lap count when the remote identification code indicated by the reception signal matches a preset central identification code.

4. The lap counting system of claim 2, wherein said central means comprises a memory which stores the central identification code.

5. The lap counting system of claim 1 wherein said central means further comprises a solar collector means for powering said central means.

6. The lap counting system of claim 1, wherein said central means further comprises a timer circuit.

7. The lap counting system of claim 6, wherein said central means further comprises a first electrical contact means and a second electrical contact means, successive activations of said first electrical contact means starting and stopping said timer circuit respectively, and activation of said second electrical contact means resetting said timer circuit.

8. The lap counting system of claim 1, wherein said central means further comprises an electrical contact means, activation of said electrical contact means causing said lap count to be reset to zero.

9. The lap counting system of claim 6, wherein said display means is also for displaying an indication of time, said indication of time being output from said timer circuit.

10. The lap counting system of claim 1, wherein said central means further comprises batteries for powering said central means.

11. The lap counting system of claim 1, wherein said display means comprises a liquid crystal display.

12. A lap counting system comprising:
remote means comprising:
attaching means for attaching the remote means to a user; and transmitting means for transmitting a radio signal;
central means comprising:
receiving means for receiving said radio signal, said receiving means having a communication range with said transmitting means, the receiving means outputting a reception signal indicative of when said transmitting means enters said communication range;
processing means for incrementing a lap count when said reception signal indicates that said transmitting means enters said communication range; and
display means for displaying said lap count; and
relay means for receiving said radio signal from said transmitting means and for transmitting a second radio signal to said central means, the relay means being disposed outside of said communication range of said transmitting means and said receiving means, the relay means and the central means having a second communication range which is greater than said communication range of said transmitting means and said receiving means;
wherein said processing means only increments said lap count from a first lap count to a second lap count when said central means receives the second radio signal from said relay means after said lap count was set to said first lap count.

13. A lap counting system comprising;
remote means comprising:
generating means for producing a continuous series of pulses;
counting means coupled to said generating means for incrementally counting to a desired predetermined value, each incremental count being made upon receipt of a pulse from said generating means; and
transmitting means operatively coupled to said counting means for transmitting a radio signal when said counting means reaches the predetermined value;
central means comprising:
receiving means for receiving said radio signal; and
processing means operatively coupled to said receiving means for incrementing a lap count when said receiving means receives the radio signal.

14. A lap counting system according to claim 13 wherein said receiving means and said transmitting means define a communication range, said receiving means only receiving said radio signal when said transmitting means is within the communication range.

15. A lap counting system according to claim 13 further comprising a shift register coupled between said counting means and said transmitting means, said shift register outputting an identification code to said transmitting means when said counting means reaches the predetermined value.

16. A lap counting system according to claim 13 wherein said counting means counts to a second predetermined value, said remote means being deactivated when said counting means reaches the second predetermined value.

17. A lap counting system comprising:
remote means comprising:
generating means for producing a continuous series of pulses;
counting means coupled to said generating means for incrementally counting a first predetermined number of counts and a second predetermined number of counts greater than the first predetermined number of counts, each incremental count being made upon receipt of a pulse from the generating means; and
transmitting means operatively coupled to said counting means for transmitting a radio signal each time said counting means reaches the first predetermined number of counts, said transmitting means transmitting the radio signal for a time less than a time required for said counting means to reach the first predetermined number of counts, said transmitting means ceasing to transmit the radio signal when said counting means reaching said second predetermined number of counts; and central means comprising:
 receiving means for receiving the radio signal; and
 processing means operatively coupled to said receiving means for incrementing a lap count when said receiving means receives the radio signal.

18. A lap counting system according to claim 17 further comprising a shift register coupled between said counting means and said transmitting means, said shift register outputting an identification code to be transmitted by said transmitting means each time said counting means reaches the first predetermined number of counts.

* * * * *